Figure 1:
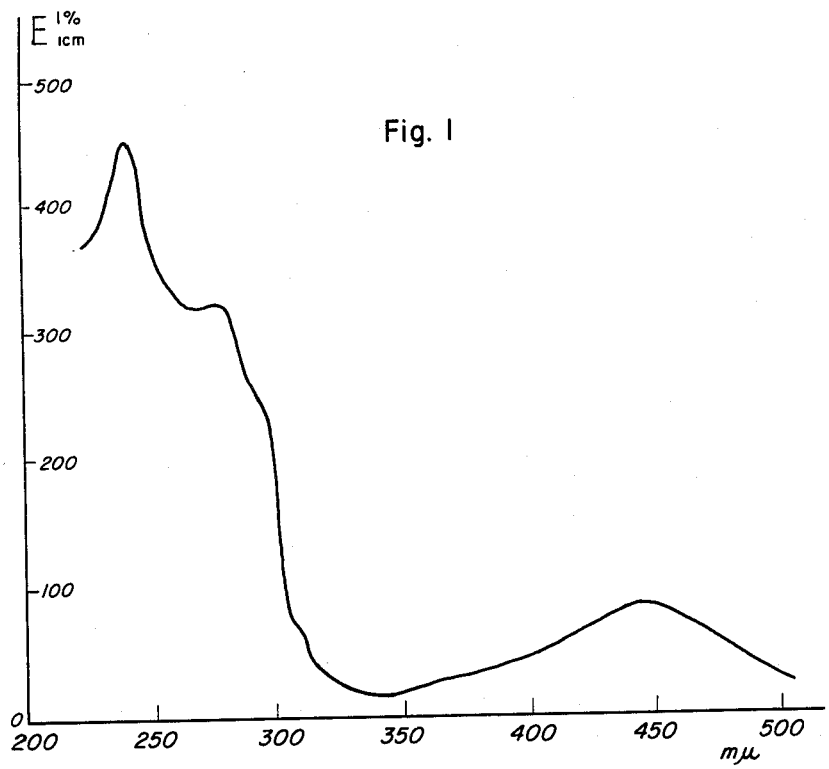

3,146,174
METHOD OF PRODUCING THE ANTIBIOTIC
MINOMYCIN
Haruo Nishimura, Ashiya-shi, Japan, assignor to
Shionogi & Co., Ltd., Osaka, Japan
Filed Jan. 13, 1961, Ser. No. 82,553
Claims priority, application Japan Jan. 16, 1960
8 Claims. (Cl. 195—80)

This invention relates to a new and useful antibiotic called Minomycin, and more particularly, to its production by fermentation, to methods for its recovery and concentration from crude solutions, such as fermentation broths, and to processes for its purification. The invention includes within its scope the antibiotic in dilute forms, as crude concentrates and in pure crystalline forms. These novel products are especially useful in combatting pathogenic microorganisms.

The new antibiotic is formed during the cultivation under controlled conditions of a new species of microorganism which has been deposited at ATCC, given accession number 14026, and named *Streptomyces minoensis* n. sp. by me.

This organism was newly isolated from a sample of soil collected from Mino Park, Osaka Prefecture, Japan, and shows the following microbiological characteristics.

*Morphological characteristics.*—The morphological property of the strain was observed on glucose-asparagine agar when grown at 28° C. for 15 days, and detail observations were made with agar cylinder method (see Nishimura and Tawara, J. Antibiotics, Ser. A, 10 (5): 227 (1957)). The aerial mycelium is abundant and cottony. The microscopic observation of the aerial mycelium is characterized by forming main stem, irregular side branch, short open spirals-forming sporophores and spherical to oval conidia.

*Physiological characteristics.*—After incubation for 14 days at 28° C. on glucose bouillon, the ring type growth and trace sediment at bottom were observed. When grown for 10 days at 28° C. on the culture including peptone as base, it decomposes glucose. In the case of incubation on glucose-asparagine agar, it grows optimally at 28° C., poorly at 37° C. and not at all at 45° C. It is observed to reduce nitrate to nitrite, when grown for 15 days at 28° C. When grown for 7 days at 28° C., it shows positive in tyrosinase reaction. When incubated for 20 days at 18° C., gelatin liquefaction proceeds slowly.

*Cultural characteristics.*—The following characteristics were observed after 15 days' incubation at 28° C., unless otherwise indicated.

A. Glucose-asparagine agar: Brownish white to light brownish gray aerial mycelium, brown to dark brown substratal mycelium, pale brown to pale yellowish brown soluble pigment.

B. Glucose agar: Poor aerial mycelium, light brownish gray substratal mycelium, no soluble pigment.

C. Starch agar: Poor aerial mycelium, dark yellow to yellowish brown substratal mycelium, no soluble pigment, starch hydrolyzed strongly.

D. Bouillon agar: No aerial mycelium, brownish gray to grayish yellow brown substratal mycelium, no soluble pigment.

E. Synthetic agar: Light brownish gray aerial mycelium, brown to yellowish gray substratal mycelium, pale yellowish brown soluble pigment.

F. Cellulose agar: Poorly grown, white aerial mycelium, pale yellowish brown substratal mycelium, no soluble pigment (observed after 20 days' incubation).

The utilization of carbon sources by the organism is shown in the following table wherein the marks "±," "+" and "++" indicate increasing utilization and, in the case of the mark "±," the carbon sources are not nearly utilized.

| Carbon sources: | Result |
|---|---|
| l-Arabinose | + |
| d-Xylose | ± |
| l-Rhamnose | ++ |
| d-Fructose | ± |
| d-Galactose | ++ |
| Saccharose | ++ |
| Maltose | ++ |
| Lactose | + |
| Raffinose | + |
| Inulin | + |
| d-Sorbit | ± |
| d-Mannit | ++ |
| dl-Inosit | ++ |
| Salicin | + |

Among many species of Streptomyces described in Bergey's Manual of Determinative Bacteriology, Waksman and Lechevalier's Actinomycetes and Their Antibiotics and other literatures, *Streptomyces diastatochromogenes* (Krainsky, 1914) Waksman and Henrici, 1948, *Streptomyces antibioticus* (Waksman and Woodruft, 1941) Waksman and Henrici, 1948, *Streptomyces tanashiensis* (Hata, Ohki and Higuchi, 1952) and *Streptomyces aureus* (Waksman and Gurtis, 1916) Waksman and Henrici, 1948, appear to be similar to the microorganism, *Streptomyces minoensis*, in the point of chromogenic type and grayish aerial mycelium on synthetic agar. However, the strain differs from *Streptomyces diastatochromogenes*, *Streptomyces antibioticus* and *Streptomyces tanashiensis* in spirals-forming sporophores and also differs from *Streptomyces tanashiensis* in nitrate reduction. The strain differs from *Streptomyces aureus* in the following point: substratum mycelia on synthetic media are always brown to yellowish brown, aerial mycelia are cottony and substratum mycelia on starch agar are dark yellow to yellowish brown. Results obtained from a comparative study of *Streptomyces minoensis* and *Streptomyces aureus* are presented in the following table.

| Properties | S. minoensis | S. aureus |
|---|---|---|
| Aerial mycelium | Cottony, long main stem, irregular side branch. Sporophores, short open spirals. Conidia, spherical to oval. | Numerous spirals. Conidia, spherical to ellipsoidal. |
| Synthetic agar | Substratum mycelia, brown to yellowish brown. Aerial mycelia, cottony, light brownish gray. Soluble pigment, pale yellowish brown. | Thin, spreading, colorless growth. Aerial mycelia, thin, gray, powdery, becoming cinnamon-drab. |
| Starch agar | Aerial mycelia, poor. Substratum mycelia, good growth, dark yellow to yellowish brown. Soluble pigment, none. | Thin, transparent, spreading growth. |
| Glucose agar | Aerial mycelia, poor. Substratum mycelia, good growth, light brownish gray. Soluble pigment, none. No hyaline margin. | Spreading, light orange growth, raised center, hyaline margin. |

As the result of the above observations, *Streptomyces minoensis* has been assigned to a new species and named *Streptomyces minoensis* n. sp.

It is to be understood that for the production of Minomycin the present invention is not limited to *Streptomyces minoensis* n. sp. It is especially desired and intended to include the use of Minomycin-producing mutants or variants produced from the described organism by various means, such as X-radiation, ultra-violet radiation and nitrogen mustards.

In accordance with one aspect of my invention, the new antibiotic Minomycin is produced during cultivation of the microorganism *Streptomyces minoensis* n. sp. in an aqueous nutrient medium at a temperature of about 25 to about 30° C. under aerobic conditions. The composition of this nutrient medium may be varied over a very wide range. Essentially what is required is a carbon source, a nitrogen source and trace inorganic elements. As a carbon source there can be used sugars, starch, glycerol, etc. Suitable sources of nitrogen for the fermentation process include meat extracts, peptone, corn steep liquor, soybean meal, peanut meal, wheat gluten, yeast extracts, etc. As sources of inorganic elements there may be used, for example, mineral salts, such as sodium chloride, potassium chloride, potassium phosphate, sodium nitrate, magnesium sulfate and the like. The following composition is an example of a suitable nutrient medium.

|  | G. per litre |
|---|---|
| Glycerol | 5 |
| Potato starch | 10 |
| Corn steep liquor | 5 |
| Soybean meal | 10 |
| Sodium chloride | 3 |
| Calcium carbonate | 3.5 |

The nutrient medium is adjusted at pH about 7 in advance of inoculation of the microorganism. If excessive foaming is encountered during the fermentation, antifoaming agents, such as vegetable oils, may be added to the fermentation medium. The pH of the fermentation tends to remain rather constant, but, if variations are encountered, a buffering agent, such as calcium carbonate, may also be added to the medium. The maximum yields of the antibiotic Minomycin can be obtained within about 90 to about 96 hours of fermentation under optimum conditions of temperature and aeration, and the active component is included in the resulting fermentation broth at the rate of 100 to 200 mcg. per ml.

After growth of the microorganism, the mycelium may be removed from the fermentation broth by various standard equipment, such as filter-presses and centrifuges, and then the antibiotic Minomycin may be recovered from the fermentation broth by a solvent extraction procedure. As the antibiotic Minomycin is retained by mycelium in appreciable quantities, a solvent extraction procedure can be preferably used to recover immediately the antibiotic Minomycin from the fermentation broth without the removal of the mycelium. Extract solvents used are, e.g., methanol, ethanol, n-butanol, chloroform, acetone, dioxane, ethyl acetate, benzene, ether and the like. For the extraction of the antibiotic Minomycin from larger volumes of broth, however, an adsorption procedure is superior to an ordinary solvent extraction procedure. For instance, the fermentation broth is filtered after the addition of adsorbents, such as diatomaceous earth, and the resulting cake of the adsorbents and the mycelium is eluted with suitable organic solvent, such as methanol, to extract the antibiotic Minomycin.

Thus obtained crude active component is further purified by suitable operations, such as recrystallization, chromatography and the like. As recrystallization solvent there can be used methanol, ethanol, n-butanol, chloroform, acetone, dioxane, ethyl acetate, benzene, ether and the like. As the adsorbent in chromatography, silicic acid is preferably used.

The antibiotic Minomycin is an orange red crystal which melts at 155–161° C. (corrected) and decomposes at 200° C. (corrected). It is soluble in methanol, ethanol, butanol, chloroform, acetone, dioxane, ethyl acetate, benzene, ether and glacial acetic acid, but insoluble in water, petroleum ether and ligroin.

Analytical data of Minomycin are as follows: Found: C, 61.17%, H, 6.52%, O, 30.77% and $OCH_3$, 3.76%; no nitrogen, sulfur or halogens. The specific rotation of Minomycin is $\alpha_D^{22} = -77.6° \pm 6°$ (c.=O. 335 percent in dioxane). The ultra-violet spectrum (shown in the attached drawing, FIG. 1) is characterized by maximum in methanol at 241 to 242 m$\mu$ ($E_{1\,cm.}^{1\%}$ 456), 276 to 279 m$\mu$ ($E_{1\,cm.}^{1\%}$ 322) and 444 m$\mu$ ($E_{1\,cm.}^{1\%}$ 79)

The absorption maximum in 2 N sodium hydroxide is found at 527 to 533 m$\mu$, while in concentrated sulphuric acid, the position of the maximum is shifted to 490 to 495 m$\mu$. The infrared adsorption spectrum of Minomycin in a Nujol mull shows the following frequencies (in microns): 2.82, 5.80, 5.87, 5.95, 6.13, 6.24, 6.34, 7.10, 7.35, 7.47, 7.80, 7.97, 8.08, 8.37, 8.57, 8.72, 8.87, 9.11, 9.53, 9.63, 9.76, 10.01, 10.55, 10.72, 10.95, 11.26, 11.72, 12.27, 12.55, 13.02, 13.53 and 13.89 (shown in the attached drawing, FIG. 2).

It gives negative Molisch, Fehling and ferric chloride tests. In 2 N sodium hydroxide, it acquires a purple colour and decolourizes the pigment in the presence of $H_2O_2$. In concentrated sulphuric acid, it acquires a yellowish red colour. In dilute hydrochloric acid, it possesses a yellow colouration. There properties of Minomycin show that it may be classified in the acid-base indication pigment group.

During the past ten years, the following antibiotic pigments having an acid-base indication property have been isolated and described from Streptomyces: actinorhordin (Brockmann et al.), rhodomycin (Brockmann et al.), rubromycin (Brockmann et al.), resistomycin (Brockmann et al.), collinomycin (Brockmann et al.), coelicolorin (Hatsuta), rhodomycetin (Shockmann et al.), rhodocidin (Charney et al.), rubidin (Banerjee et al.), cyanomycin (Funaki et al.), granaticin (Corbaz et al.) and ayamycin (Kuroya et al.). Among those compounds, actinorhordin, rubromycin, resistomycin, collinomycin, granaticin and ayamycin do not contain nitrogen. Minomycin is also related to this group. However, the antibiotic Minomycin can be differentiated from those related compounds on the basis of its physical and chemical properties as described above.

Minomycin shows activity against a variety of microorganisms and the following table illustrates the antibiotic spectrum of Minomycin through tests performed against a variety of such microorganisms.

| Test organisms | Minimal inhibitory concentration, mcg. per ml. |
|---|---|
| *Staphyloccus aureus*, 209 P | 0.50 |
| *Bacillus subtilis*, PCI-219 | 0.05 |
| *Sarcina lutea* | 0.20 |
| *Bacillus anthracis* | 0.02 |
| *Diplococcus pneumoniae*, type I | 0.01 |
| *Diplococcus pneumoniae*, V-type I | 0.01 |
| *Diplococcus pneumoniae*, type II | 0.10 |
| *Diplococcus pneumoniae*, type III | 0.05 |
| *Streptococcus hemolyticus*, D | 0.05 |
| *Streptococcus hemolyticus*, HA | 0.05 |
| *Corynebacterium diphtheriae*, Tront | 0.02 |
| *Corynebacterium diphtheriae*, S | 0.02 |
| *Klebsiella pneumoniae* | 50.00 |
| *Escherichia coli* | 50.00 |
| *Salmonella typhosa* | 50.00 |
| *Salmonella paratyphi* B | 50.00 |
| *Shigella dysenteriae* | 05.00 |
| *Shigella paradysenteriae*, O'hara | 50.00 |
| *Mycobacterium tuberculosis* var. *hominis*, H37Rv | 50.00 |
| *Aspergilus niger* | 50.00 |
| *Candida albicans* | 50.00 |
| *Torula* sp. | 50.00 |
| *Trichophyton purpureum* | 50.00 |
| *Rhizopus nigricans* | 50.00 |
| *Penicillium digitatum* | 50.00 |

From the result, it will be seen that the antibiotic Minomycin is highly active against a large variety of gram-positive organisms, but shows little or no activity against gram-negative bacteria tested. And also, no activity was observed against fungi. Accordingly, Minomycin is useful in processes where it is desired to inhibit the growth of gram-positive organisms. It is useful for sterilizing equipment, for example, surgical instruments, and for the purposes of classifying organisms. It is also useful in obtaining pure cultures of single organisms where a susceptible organism may be separated from a resistant one.

The following examples are given solely for the purpose of illustration and are not to be construed as limitations of this invention, many variations of which are possible.

Example

A nutrient medium was prepared from the following materials:

|  | G. per litre |
|---|---|
| Glycerol | 5 |
| Potato starch | 10 |
| Corn steep liquor | 5 |
| Soybean meal | 10 |
| Sodium chloride | 3 |
| Calcium carbonate | 3.5 |

After adjusting the mixture to a pH of 7, steam was passed through the mixture to sterilize the same. Then, the nutrient medium was inoculated with *Streptomyces minoensis* n. sp. and cultivated under aeration for a period of 90 to 96 hours, controlling the temperature at 27° C. with shaking. The fermentation broth was tested according to paper-disc or cup method using *Staphylococcus aureus* (Terashima) or *Bacillus subtilis* PCI 219 to include Minomycin in the concentration of 100 to 200 mcg. per ml.

One percent by weight of Hyflo super-cell (Johns-Manville) was added to the fermentation broth containing the mycelium and the mixture was adjusted to a pH of 4.0 to 4.5 with hydrochloric acid. After 30 minutes of stirring, the mixture was filtered with suction. The filtered Hyflo and mycelial cake was eluted with a total of ½ volume (based on the broth) of methanol, vigorously agitating. After one-half hour, the mixture was filtered, and the methanol extract was then concentrated in vacuo to yield a precipitate. The methanol concentration was placed in the refrigerator overnight to give a dark yellow or reddish yellow mass. The mass was filtered, washed with petrodeum ether. On drying this mass in a vacuum desiccator, a dark yellow powder of Minomycin was obtained.

The methanolic filtrate was further concentrated in vacuo. The resultant aqueous solution was extracted with equal volume of ethyl acetate or chloroform. The ethyl acetate or chloroform extract was concentrated to a small volume. A crude precipitate was obtained by adding to the ethyl acetate or chloroform extract ten volumes of petroleum ether. The precipitate was washed with petroleum ether. On drying this precipitate in a vacuum desiccator, reddish brown powder of Minomycin was obtained.

Both dried powders of Minomycin were then dissolved in a small volume of ethyl acetate and passed over a silicic acid (Mallinckrodt, 100 mesh) column prepared with petroleum ether. The column was developed with ethyl acetate. The active eluates were combined, concentrated under reduced pressure to a low volume, and held at 10° C. to effect crystallization. The crystals were dissolved in a minimal amount of ethyl acetate and recrystallized to afford Minomycin as orange red pillars melting at 155–161° C. and decomposing at 200° C. The yield is generally about 300 mg. per 10 l. of the fermentation broth.

Having thus described the subject matter of my invention, what it is desired to secure by Letters Patent is:

1. A process for producing an antibiotic, Minomycin, which comprises cultivating *Streptomyces minoensis* in an aqueous nutrient medium under aerobic conditions.

2. A process for producing an antibiotic, Minomycin, which comprises cultivating *Streptomyces minoensis* in an aqueous nutrient medium under submerged aerobic conditions at a temperature of from about 25 to about 30° C. for a period of from about 90 to about 96 hours.

3. A process for producing an antibiotic, Minomycin, which comprises cultivating *Streptomyces minoensis* in an aqueous nutrient medium under submerged aerobic conditions and recovering Minomycin from the fermentation broth.

4. A process for producing an antibiotic, Minomycin, which comprises cultivating *Streptomyces minoensis* in an aqueous nutrient medium under submerged aerobic conditions, filtering the fermentation broth and extracting the filtrate broth with a water-immiscible organic solvent.

5. A process for producing an antibiotic, Minomycin, which comprises cultivating *Streptomyces minoensis* in an aqueous nutrient medium under submerged aerobic conditions and extracting the fermentation broth with a water-immiscible organic solvent.

6. A process for producing an antibiotic, Minomycin, which comprises cultivating *Streptomyces minoensis* in an aqueous nutrient medium under submerged aerobic conditions, adding an adsorbent to the fermentation broth, filtering the mixture and extracting the resulting cake of the adsorbent and the mycelium with a water-immiscible organic solvent.

7. A process for producing an antibiotic, Minomycin, which comprises cultivating *Streptomyces minoensis* (ATCC 14026) in an aqueous nutrient medium under submerged aerobic conditions, treating the fermentation broth with an adsorbent at a pH of from about 4.0 to about 4.5, filtering the mixture, extracting the resulting cake of the adsorbent and the mycelium with a water-immiscible organic solvent, concentrating the extract to obtain a precipitate and chromatographing the precipitate with subsequent elution to isolate Minomycin.

Figure 2:
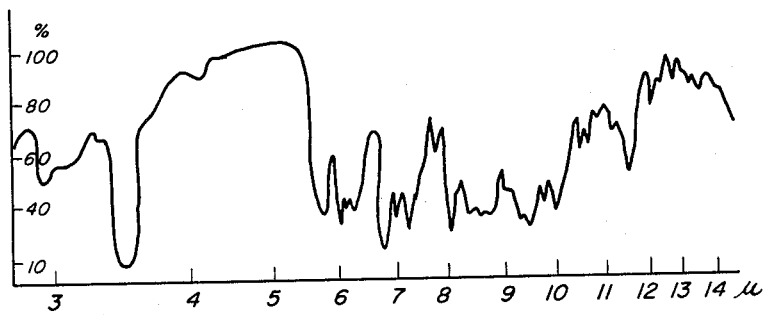

8. A process for producing Minomycin, an antibiotic classified in the acid-base indication pigments group, containing only the elements carbon, hydrogen and oxygen in substantially the following proportions by weight:

|  | Percent |
|---|---|
| Carbon | 61.17 |
| Hydrogen | 6.52 |
| Oxygen | 30.77 | being red orange pillars melting at 155–161° C. with decomposition at 200° C., having an optical rotation of $\alpha_D^{22} = -77.6 \pm 6$ when dissolved in dioxane (c., 0.335%), and showing the ultra-violet spectrum and the infrared spectrum as in the attached drawing, FIG. 1 and FIG. 2, respectively, which process comprises cultivating *Streptomyces minoensis* n. sp. in an aqueous nutrient medium under aerobic conditions.

No references cited.